(No Model.)  2 Sheets—Sheet 1.
J. J. FAULKNER.
MEANS FOR OPERATING HOUSEHOLD DEVICES.
No. 542,335. Patented July 9, 1895.
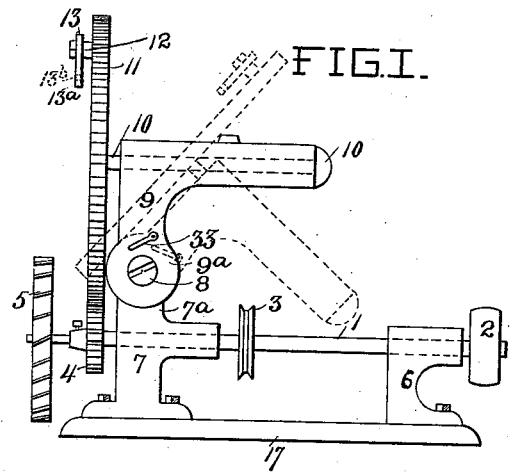
FIG. I.
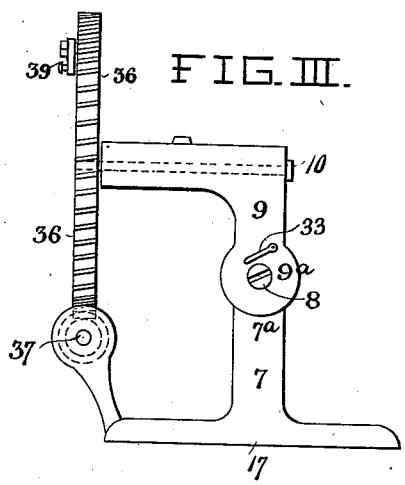
FIG. III.
Attest:
Walter E. Allen.
Walter Allen
Inventor,
James J. Faulkner,
By Knight Bros
Attorneys.

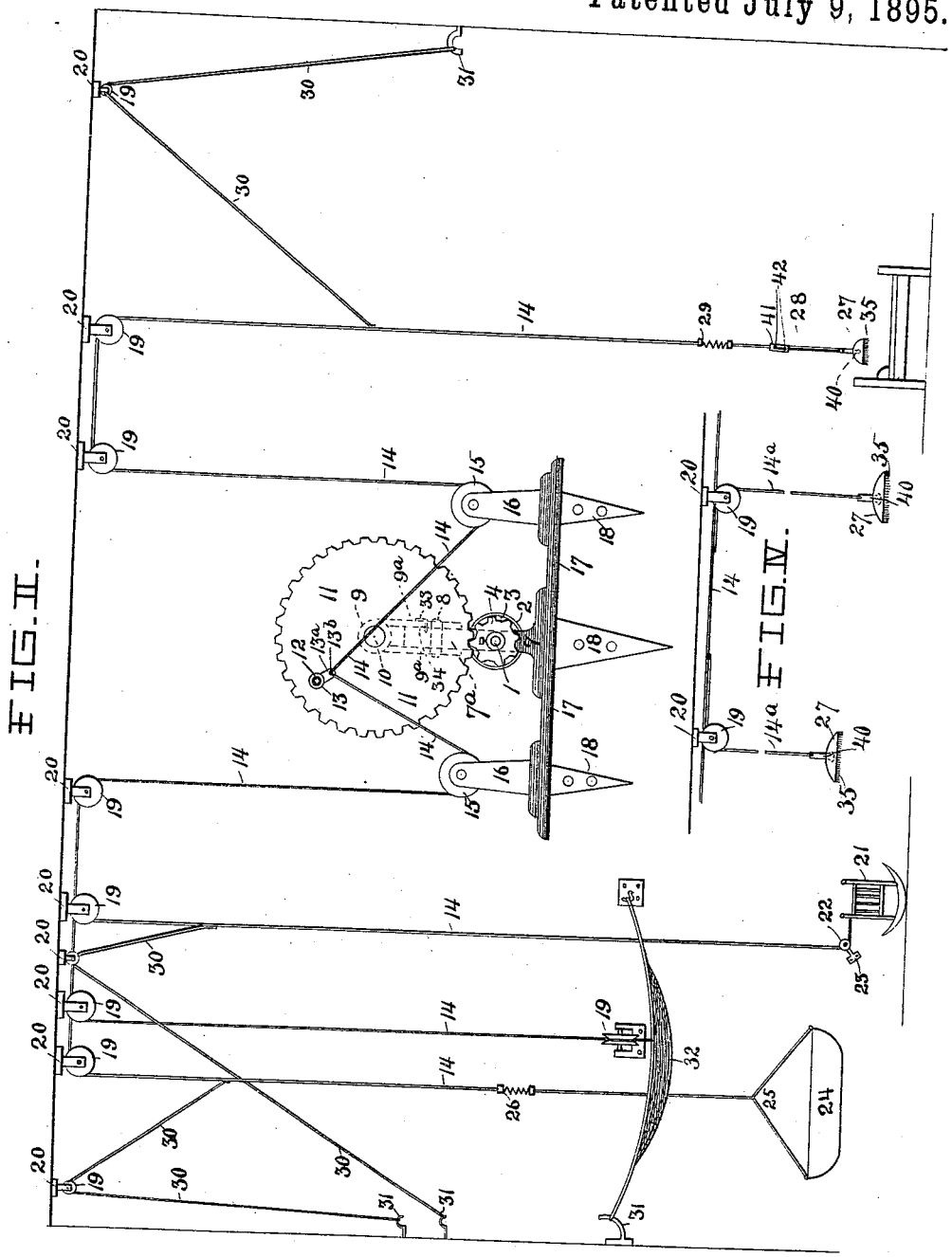

UNITED STATES PATENT OFFICE.

JAMES J. FAULKNER, OF ST. LOUIS, ASSIGNOR OF A PART OF HIS RIGHT TO FRED HARMON PADDELLE, OF BAY CITY, AND EDWARD J. FITZHARRIS, OF SAGINAW, MICHIGAN.

MEANS FOR OPERATING HOUSEHOLD DEVICES.

SPECIFICATION forming part of Letters Patent No. 542,335, dated July 9, 1895.

Application filed May 14, 1894. Serial No. 511,105. (No model.)

*To all whom it may concern:*

Be it known that I, JAMES J. FAULKNER, a citizen of the United States, and a resident of St. Louis, in the county of Gratiot and State of Michigan, have invented an Improvement in Means for Operating Household Devices, of which the following is a specification.

My invention relates to an apparatus for performing the work incident to the operation of ordinary household devices, such as rocking a cradle, swinging a hammock, and oscillating or reciprocating ventilating-fans; and the improvement consists in an operating device of peculiar construction, as hereinafter more fully described, and pointed out in the claims, and which is connected with a driving-shaft rotated by a suitable motive power.

In order that my invention may be fully understood, I will proceed to describe it with reference to the accompanying drawings, in which—

Figure I is a side elevation of my improved apparatus for operating household devices. Fig. II is a front elevation showing the apparatus connected with various devices, the rotary fan being omitted. Fig. III is a side elevation showing a modification in the gearing. Fig. IV is a front elevation showing counterbalanced fans.

1 is a driving-shaft, which may be driven by a suitable motive power carrying drive-pulley 2, transmitting-pulley 3, a pinion 4, and a rotary air-circulating fan 5.

6 and 7 are standards providing bearings for the driving-shaft, the forward standard 7 of which has an upward extension $7^a$, to which are hinged by a pivot 8 the cheek-plates $9^a$ of a sleeve-bracket 9, carrying a counter-shaft 10, having a power gear-wheel 11 of vulcanized paper meshing with the pinion, which is of similar material, on the driving-shaft. The gear-wheel has an eccentrically-arranged wrist-pin 12, carrying a collar 13. The collar is provided with an arm $13^a$, formed with an eye $13^b$, for the attachment of connecting-cords 14. Located on opposite sides of the gear-wheel are guide-pulleys 15, mounted in short standards 16. Around these guide-pulleys the connecting-cords are passed. The device may be mounted on a single base or shelf 17, supported by brackets 18 in any desirable place, such as a location where the air-circulating fan 5 (see Fig. I) is needed for keeping the air in circulation.

19 are guide-pulleys mounted on suitable brackets 20. Of these guide-pulleys there may be any desirable number for conducting the connecting-cords to the devices to be operated. The devices shown are those which operate with a reciprocating or back-and-forth movement.

21 is a cradle which is connected to one branch of the cord 14, passed under a pulley 22 on a bracket 23, so that a proper movement is transmitted.

24 is a vertically-moving cradle suspended by a cord 25, connected by means of a coil-spring 26 with a branch of the connecting-cord.

27 is a suspended reciprocating fan for driving away flies and mosquitoes, connected with one of the branch cords through means of a cord 28 and coil-spring 29. The branch cords of the vertically-swinging cradle and fan may be provided with hoisting-ropes 30 for raising these devices out of the way, secured to belaying-pins 31. The reciprocating fan is provided with a fringe 35 for governing its vertical movement, the fringe being thrown outward by the quick descent of the fan. Within the fan beneath the handle, is a weight 40 for imparting a quick return movement to the gravitating fan. Two or more fans can be connected, as shown in Fig. IV, having an equal number of them on each cord or power-transmitter, so that the weight is balanced and the fans can be driven by a light power. It will be seen that when the supporting-cord $14^a$ of one fan is pulled up the cord of the other fan is let down, and vice versa. The fans are preferably geared or connected so as to let them have a quick return by gravitation.

The connecting-cord for the fan is adjusted in length so as to support the fan at the proper elevation above the bed or table by means of a take-up, consisting of a block 41, having two holes 42 for the passage of the connecting-cord secured to the outer end of the cord, the connecting-cord passing freely through the fan handle or support.

32 is a hammock having connection with a branch of the connecting-cord similar to that described with reference to the other devices. One of the cheek-plates of the sleeve-bracket is provided with a spring 33, carrying a locking-pin 34, passing through an orifice in the cheek-plate and entering sockets in the standard extension 7ª for securing the sleeve-bracket in different positions, either for the engagement or disengagement of the gear-wheel.

In the modification shown in Fig. III, I show the substitution of a power worm-wheel 36 for the gear-wheel and a worm-shaft 37 as a substitute for the driving-shaft and pinion. The power worm-wheel is provided with a crank 39, with which the cords are connected.

Now it is obvious that my invention is equally applicable to other devices, such as a long series of fly-fans, such as used over a number of dining-tables in a dining-hall. The power-wheel rotates constantly in one direction and imparts a back-and-forth movement to the cords. There are two primary cords running in opposite directions from the power-wheel, so that the load is balanced and the work equalized.

Having thus described my invention, the following is what I claim as new therein and desire to secure by Letters Patent:

1. The combination, with a driving shaft carrying a pinion, of a gear-wheel in gear with said pinion mounted in bearings formed by an upward extension of one of the bearings of the driving shaft, a pin eccentrically mounted on said gear-wheel and pulley cords attached to said pin, whereby said cords will be given a reciprocating motion by the rotation of the gear-wheels, substantially as described.

2. The combination with a driving shaft carrying a pinion, a gear-wheel in gear with said pinion mounted in bearings pivotally connected to an upward extension of one of the bearings of the driving shaft, a pin eccentrically mounted on said gear-wheel, and pulley cords attached to said pin, whereby said cords will be given a reciprocating motion by the rotation of the gear-wheel, substantially as described.

3. The combination with a driving shaft carrying a pinion, of a gear-wheel in gear with said pinion mounted in bearings pivotally connected to an upward extension of one of the bearings of the driving shaft, locking means for holding said gear-wheel in gear with said pinion, a pin eccentrically mounted on said gear wheel, and pulley cords attached to said pin, whereby said cords will be given a reciprocating motion by the rotation of the gear-wheel, substantially as described.

JAMES J. FAULKNER.

Witnesses:
B. A. CHURCH,
A. S. McINTYRE.